This invention relates to a method and apparatus for determining bore hole vertical deviation and particularly to such method and apparatus for use in connection with large diameter boreholes or shafts.

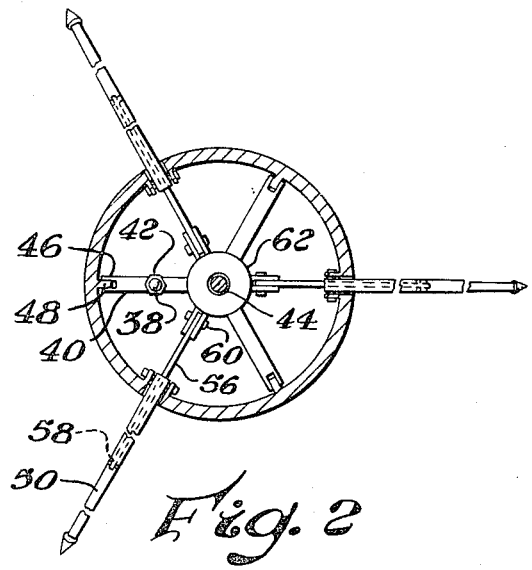
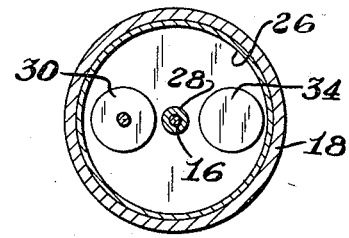
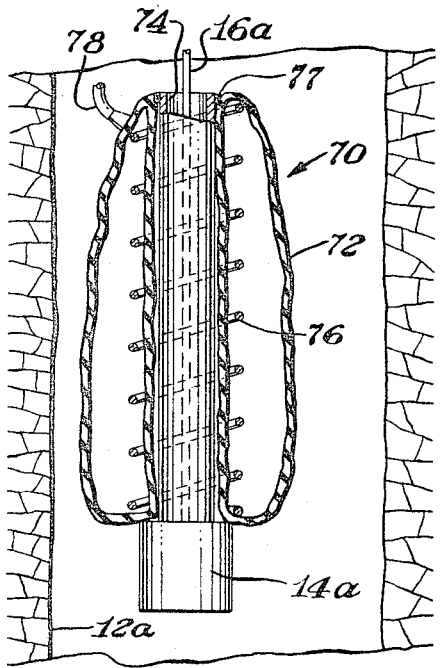
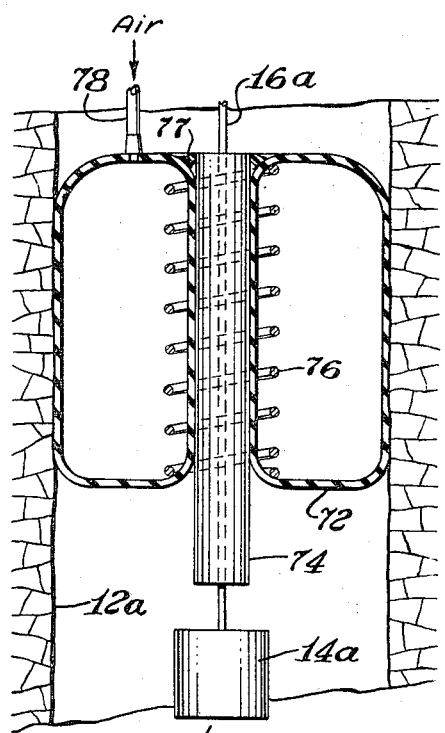
Fig. 2
Fig. 3
Fig. 4
Fig. 5
INVENTORS.
Gerald D. Patterson
Steven G. Williams
Arthur J. Myers
BY Earl D. Ayres
AGENT 3,323,612
SONIC METHOD FOR DETERMINING BOREHOLE VERTICAL DEVIATION
Gerald D. Patterson, Steven G. Williams, and Arthur J. Myers, all of Tulsa, Okla., assignors to The Dow Chemical Company, Midland, Mich., a corporation of Delaware
Filed July 6, 1965, Ser. No. 469,708
6 Claims. (Cl. 181—.5)

When large diameter shafts or boreholes are drilled or otherwise cut into the earth, it is usually desirable to insert metal casing into the borehole from the top to at least near the bottom of the hole. Usually the annular space between the casing and the wall of the shaft or well bore is filled with cement or other suitable material.

Because large diameter metal casing is costly, heavy, relatively rigid and expensive to lower into the shaft or well bore, it is highly desirable that the deviation of the shaft or borehole from a vertical direction be known in order to determine if the casing may be lowered into the borehole or shaft and extend from the top to the desired lower level of the shaft or borehole without meeting physical obstruction.

It is extremely difficult to drill or cut a deep shaft or borehole whose centerline is a straight line. Thus, unless the shaft or borehole is substantially bigger in diameter than the diameter of the casing to be lowered into the shaft, any curves in the shaft or well bore will probably result in the casing becoming struck against the wall of the shaft or borehole.

If the deviation of the shaft or borehole is known, the wall of the shaft or borehole may be modified before insertion of the casing to correct or eliminate the deviation to an extent which will permit the casing to be lowered to the desired depth in the shaft or borehole.

Accordingly, a principal object of this invention is to provide an improved method and apparatus for measuring vertical deviation of a shaft or borehole.

Another object of this invention is to provide an improved, simple to use method and apparatus for determining the depth and direction of vertical deviation of a shaft or borehole.

In accordance with this invention, a so-called sonar caliper tool is centered over the shaft or borehole and then lowered into the shaft or borehole. As the sonar caliper tool is lowered, sonar readings are taken at discrete intervals of depth to determine the distance between the tool and the entire circumference of the borehole. The readings, which are oriented as to direction, show the deviation of the borehole from the centerline extending from the surface in accordance with the variance of the distance between the tool and the circumference of the shaft or borehole, as the sonar caliper tool scans the shaft or borehole.

When the sonar caliper tool is lowered to a depth at which it almost touches the wall of the shaft or borehole, the deviation is noted. A mechanical device disposed above the sonar caliper tool then centers the tool once again in the shaft or borehole. A new deviation reading is made before lowering the sonar caliper tool so that correlation between the previous deviation and the relocated tool may be made.

Readings are then made as before as the sonar caliper tool is lowered down the borehole.

When the sonar caliper tool again approaches close to the wall of the shaft or well bore, the mechanical device may be retracted and lowered with the tool to the new depth and then, after the caliper tool is again centered, more readings are taken as the tool is again lowered.

The mechanical device for centering the tool may, for example, be an inflatable element or a 3 armed centering element which expands around the cable on which the sonar caliper tool is lowered and, when inflated or expanded, contacts the walls of the shaft or bore.

The invention, as well as additional objects and advantages thereof, will best be understood when the following detailed description is read in connection with the accompanying drawings, in which:

FIG. 2 is a sectional view taken along the line 2—2 of FIG. 1;

FIG. 3 is a sectional view taken along the line 3—3 of FIG. 1;

FIG. 4 is a side elevational view, partly in section, showing an un-inflated inflatable device useful in centering the sonar caliper in a borehole; and FIG. 5 is a side elevational view, partly in section, of the device of FIG. 4 shown in its inflated form.

Figure 1:
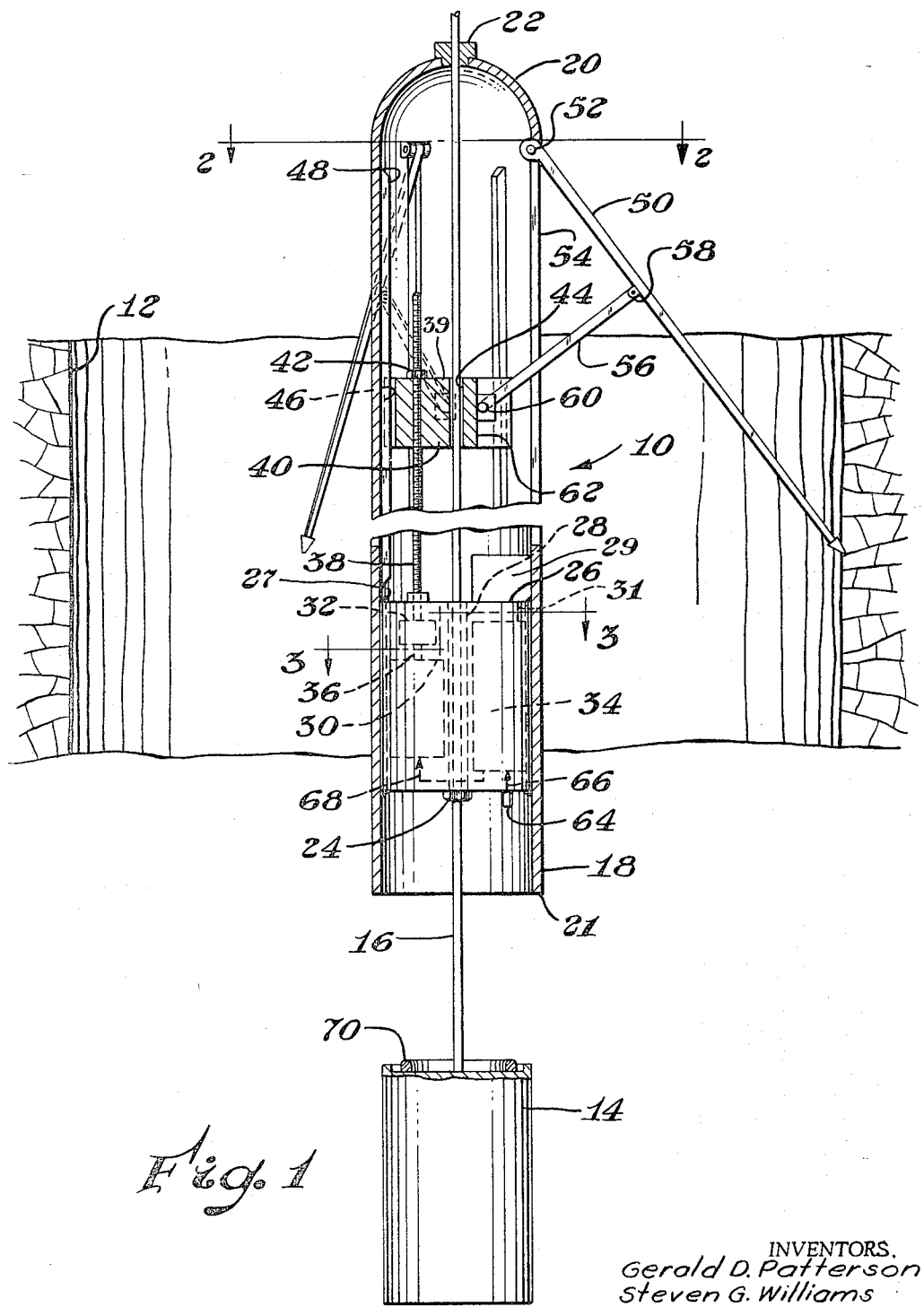
FIG. 1 is a diagrammatical view, partly in section, of centering apparatus for use in carrying out the method of this invention.

Referring to the drawings, and particularly to FIGS. 1, 2 and 3, there is seen sonar tool centering apparatus, indicated generally by the numeral 10, which includes, within a shaft or borehole having walls 12 and carried by a cable 16 having a sonar caliper tool 14 attached to its lower end, an elongated hollow, walled tubular housing 18 having a dome-like upper end 20 and an open lower end 21.

A hollow cylindrical member 26 having closed side walls and ends is disposed within the housing 18 and secured to the walls thereof, as by the fillets 27.

A tubular element 28 extends axially through the member 26 and is sealed to the ends of the member 26. A cable guide bushing 24 is secured to the lower end of the tubular element 28 and a similar cable guide bushing 22 is secured to the dome-like end 20 of the housing 18.

Mounted within the hollow cylindrical member 26 is a motor 30, control apparatus 34, torque limiting clutch 32, low impedance electrical contact 64, an electrical lead member 66 which extends between the contact 64 and the control apparatus 34, an electrical lead member 68 coupled between the control apparatus 34 and the electric motor 30, and a threaded shaft 38 which extends through a packing gland 39 in the upper end of the member. The lower end of the shaft 38 and the shaft 36 of the motor 30 are each coupled to the torque limiting clutch 32.

An array of three spacer arms 50, symmetrically disposed around the upper part of the housing 18, each arm being coupled to hinges 52 at the upper end of slots 54 in the housing. The slots 54 extend downwardly from near the dome-like upper end 20. The length of the slots 54 is at least equal to the length of the arms 50. The slots 54 are aligned parallel with respect to the longitudinal axis of the housing 18.

The threaded shaft 38 extends upwardly through a bushing 42 having threads on its inner surface which engage the threads on the shaft 38.

The bushing 42 is affixed to a member 39 having a hollow cylindrical part with three symmetrically disposed fins 40 extending outwardly from the side walls of the cylindrical part. The member 39 is so aligned that its side walls are parallel with respect to the longitudinal axis of the housing. The cable 16 extends through the hollow cylindrical part of the member 39.

Each of the fins 40 have slotted outer edges 46 which extend lengthwise of the fin. The slotted edges 46 straddle guide strips 48 which are secured to and extend inwardly from the inner wall surface of the housing 18. The configuration of the strips 48 is such that they are disposed parallel to the slots 54, each of the strips 48 being disposed half-way between a pair of slots 54.

Actuator arms 56 extend from hinges 60 on the cylindrical body part of the member 39 to hinges 58 on each of the spacer arms 50.

A frequency detector device 29 is disposed in a fluid-tight housing above the cylindrical member 26. The device 29, which contains a frequency sensitive apparatus is coupled to the control apparatus 34 by a connecting cable 31. The contact 64, previously mentioned, interconnects the control apparatus to sonar tool 14; the control apparatus will not function unless connected to the sonar tool 14 through the contact 64. The actual construction of the device 29 will be well known to those skilled in the art. The frequency sensitive apparatus in the device 29 causes the control apparatus 34 to energize the motor 30 to rotate in one direction in response to a signal of one frequency and to energize the motor 30 to rotate in the other direction in response to a signal of another frequency.

In practicing the method of this invention, the cable 16 carrying the sonar caliper tool 14 and the housing 18 (with the spacer arms 50 retracted) is centered over the borehole 12, and the sonar tool 14 lowered into the borehole. As the sonar tool 14 is lowered to discrete intervals of depth, the tool scans a 360 degree pattern and provides an output signal which is read at the surface by special read-out equipment which provides a representation of the distance between the sonar tool 14 and the circumference of the well bore. The cable 16 is, for example, a multiple conductor cable which also serves as a support cable. The cable 16 provides means for transmitting the output signal from the sonar caliper tool 14 to the read-out equipment at the surface, for supplying electrical power to the sonar caliper tool if it is not operated by self-contained batteries, and for transmitting signals to control the operation of the motor 30.

If the borehole being surveyed does in fact deviate from the centerline as projected vertically downwardly from the surface, the sonar tool will at some depth along the borehole approach one of the side walls of the borehole. If the deviation from the centerline is sufficient, the sonar tool and/or the cable 16 will bear against the wall of the borehole or shaft, thus preventing the representation on the read-out equipment from indicating the true deviation from the centerline.

When the sonar tool 14 approaches so closely to the wall of the borehole 12 that the output signal doesn't show the true cross sectional configuration of the borehole, or if the tool 14 drags along the surface of borehole 12 because of angular deviation of the hole, a signal is transmitted down the cable 16, thru the contact ring 70 and contact 64 to detector device 29 to control apparatus 34 to operate the motor 30. As the shaft 36 of the motor 30 rotates, the torque limiting clutch 32 rotates, rotating the screw shaft 38. The rotation of the screw shaft 38 within the bushing 42 forces the member 39 upwardly to open the spacer arms 50, moving the lower end of the actuator arms 56 upwardly and forcing the three spacer arms 50 outwardly whereby they contact the wall of the shaft or borehole 12. As the particular spacer arm 50 closest to the wall contacts the wall, the tubular housing 18 is moved toward the center of borehole 12 until the three symmetrically spaced arms all touch the wall and seat thereon at which time the torque limiting clutch 32 slips and prevents the application of excessive moving force to the arms 50.

With the spacer arms 50, which are of equal length, each seated upon the wall of the shaft or borehole the sonar tool 14 is again centrally disposed within the shaft or borehole.

The sonar tool 14 then scans the borehole, giving an output signal which is converted to a representation of the distance between the sonar tool 14 and the circumference of the boreholt or shaft. The difference between the sonar tool and the borehole wall before and after the sonar tool is re-centered is noted.

As the sonar tool 14 is lowered on the cable 16, which passes through the tubular element 28, to make successive scans, the contact ring 70 on the top of the sonar tool 14 separates from contact 64 inasmuch as centering apparatus 10 remains supported and centered within borehole 12. Energization of the motor 30 is not now possible since the connection between contact ring 70 and contact 64 is broken.

The sonar tool 14, as it is lowered further into the shaft or borehole 12, scans the width of the shaft or borehole to provide an output signal which is passed up the cable 16 and translated, as mentioned previously, into a representation which shows the distance between the tool and the periphery of the shaft or borehole 12.

If, as the tool 14 is lowered and successive scans made of the distance between the tool and the periphery of the shaft or borehole, the tool again approaches the wall of the shaft or borehole, the depth is noted, and then the tool is withdrawn until it fits within the tubular element 28 to cause electrical contact between contact ring 70 and the contact 64.

Then, with the contact made, a suitable signal is transmitted from the surface to operate the detector device 29, in turn causing the motor 30 to be energized to operate in a reverse direction, retracting the spacer arms 50 and allowing tool centering apparatus 10 to rest up sonar tool 14.

The centering apparatus 10 and sonar tool 14 are then lowered to the depth of the last "scan" of the sonar tool and the centering apparatus 10 is again centered in the shaft or borehole 12 as previously described.

The sonar tool 14 then is lowered and the periphery of the shaft or borehole scanned at various depths as done previously to provide a measure of the distance from the sonar tool to the periphery of the shaft or bore hole.

Breaking the contact between contact 64 and contact ring 70 serves to prevent the spacer arms being accidentally released and the centering apparatus 10 unseated. Since the centering apparatus 10 is supported by the sonar tool 14 except when the spacer arms 50 engage the wall of the borehole or shaft, it can be appreciated that the sonar tool could be damaged if the element 28 were unseated from the wall of the shaft or borehole and fell downward along cable 16 from some distance above the sonar tool.

Another device which may be used for centering the sonar tool 14a is shown in FIGS. 4 and 5. A tubular sleeve 74, made of metal, for example, to which is secured, as by the adhesive 77, a toroidal shaped inflatable member, indicated generally by the numeral 70. The walls 72 of the member 70 are thick enough to withstand abrasion and puncturing when the walls bear against the wall 12a of the shaft or borehole. A coil spring 76 is disposed within the member 70, surrounding the sleeve 74. A hollow stem 78 extends through the wall 72.

In operation, the inflatable member 70, along with the sleeve 74, rests on the upper part of the sonar tool 14a as the cable 16a is lowered down the shaft or borehole 12a. The spring 76 keeps the inflatable member 70 spread along the sleeve 74 (the member 70 being secured to the sleeve only at the upper part of the sleeve), so that the sides of the inflatable member are retained at a diameter which is not excessively large.

When the appaartus starts to approach the wall 12a of the well bore or shaft, as mentioned in connection with the use of the apparatus shown in FIGS. 1, 2 and 3, the inflatable member 70 may be inflated, either by remote signal from a pressurized gas source coupled to the apparatus (but not shown) or through a tube (not shown) extending from the surface to the stem 78.

The inflation of the member 70, as shown in FIG. 5, centers the sonar tool 14a as did the apparatus shown in FIGS. 1, 2 and 3. The connection involved in re-centering the sonar tool 14a is made as described where the apparatus of FIGS. 1, 2 and 3 are used, and the down hole scanning resumed. Re-centering of the sonar tool 14a is accomplished by noting the depth of the last scan which gave suitable distance information, then drawing the tool 14a up against the lower end of the sleeve 74, and then dis-inflating the member 70. The assembly is then lowered to the depth of the last scan which gave suitable distance information (tool 14a to wall 12a), the member 70 re-inflated, and then re-scanning is done to determine the correction in deviation caused by the re-centering of the tool 14a, and further down-hole scanning is done.

Because the scanning gives an output signal which indicates the direction of orientation of the tool 14 or 14a, as well as the distance from the tool to the wall of the shaft or bore hole 12 or 12a, the deviation of the shaft or bore hole from the vertical may be determined both in amount and direction as the scanning proceeds down the shaft or bore hole 12 or 12a.

Sonar tool scanning apparatus suitable for use in connection with this invention is well known to those skilled in the art. For example, apparatus of the type shown in U.S. Patent No. 2,631,270 to R. W. Gobel is suitable except that means for superimposing a "direction" signal on the output signal is provided. A "direction" of scan signal may be obtained by utilizing a gyro-compass type device to keep an electrical contact at a "North" position, for example, and then have a separate electrical contact moving with the scanning part of the sonar tool momentarily make contact with the "North" position contact to provide means whereby a directional orientation signal may be transmitted up the cable 16 or 16a.

While the sonar signal from the apparatus 14 or 14a is transmitted more readily through a liquid media, it has been found that the sonar signal is transmitted effectively for the purpose of this invention when the apparatus 14 or 14a is used with air as the medium through which the sonar signal passes.

What is claimed is:
1. A method of determining the extent of deviation from the vertical of a bored hole which extends into the earth, comprising:

(A) locating over said bored hole a rotatable sonar device capable of deriving a signal as it rotates which is a function of the distance between the device and the periphery of said bored hole as measured in the direction the device is oriented,
(B) lowering said device into said bored hole and rotating said sonar device at discrete intervals of depth in said bored hole to determine the relative position of said device with respect to said periphery of said bored hole,
(C) noting said relative position of said device when it approaches the periphery of said bored hole and the depth of said device,
(D) moving said device to a more central position in said bored hole at said last mentioned depth and noting the change in relative position with respect to said periphery before and after said device is moved to a more central position,
(E) continuing to lower said device and determine the relative position of said device with respect to said periphery of said bored hole at discrete intervals of depth.

2. A method in accordance with claim 1, wherein the changes in relative position of the device with respect to the periphery of the bored hole at the various depths of the bored hole are plotted as a function of the deviation of the bored hole from the vertical.

3. A method in accordance with claim 1, wherein said sonar device is re-centered more than once as it is lowered down said bored hole.

4. A method in accordance with claim 1, wherein said bored hole has a diameter in the order of a few feet.

5. A method in accordance with claim 1, wherein said bored hole is at least partially filled with liquid.

6. A method in accordance with claim 1, wherein said bored hole is substantially free of liquid where said deviation is measured.

References Cited
UNITED STATES PATENTS

| | | | |
|---|---|---|---|
| 1,999,201 | 4/1935 | Nichols | 175—45 X |
| 2,631,270 | 3/1953 | Goble | 181—0.5 |
| 3,014,282 | 12/1961 | Wist | 33—205 |
| 3,252,225 | 5/1966 | Hixson | 33—205 |

SAMUEL FEINBERG, *Primary Examiner.*

W. KUJAWA, *Assistant Examiner.*